US011095792B2

(12) United States Patent
Okuno

(10) Patent No.: US 11,095,792 B2
(45) Date of Patent: Aug. 17, 2021

(54) INFORMATION-PROCESSING DEVICE IMPORTING THEREIN SETTING INFORMATION STORED IN REMOVABLE STORAGE MEDIUM IN ACCORDANCE WITH SETTING INSTRUCTION INFORMATION STORED THEREIN TOGETHER WITH SETTING INFORMATION

(71) Applicant: BROTHER KOGYO KABUSHIKI KAISHA, Nagoya (JP)

(72) Inventor: Tetsuya Okuno, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 16/816,518

(22) Filed: Mar. 12, 2020

(65) Prior Publication Data

US 2020/0296247 A1 Sep. 17, 2020

(30) Foreign Application Priority Data

Mar. 14, 2019 (JP) .............................. JP2019-047058

(51) Int. Cl.
*H04N 1/00* (2006.01)
(52) U.S. Cl.
CPC . *H04N 1/00965* (2013.01); *H04N 2201/0094* (2013.01)
(58) Field of Classification Search
CPC .................... H04N 1/00965; H04N 2201/0094
See application file for complete search history.

(56) References Cited

U.S. PATENT DOCUMENTS

| 9,912,827 | B2* | 3/2018 | Nakahara | H04N 1/0097 |
| 2012/0236327 | A1* | 9/2012 | Choi | G06F 3/122 |
| | | | | 358/1.2 |
| 2014/0022591 | A1* | 1/2014 | Asahara | G06K 15/402 |
| | | | | 358/1.15 |

FOREIGN PATENT DOCUMENTS

| JP | 2007-094155 A | 4/2007 |
| JP | 2010-220121 A | 9/2010 |
| JP | 4622926 B2 | 2/2011 |

* cited by examiner

*Primary Examiner* — Neil R McLean
(74) *Attorney, Agent, or Firm* — Scully, Scott, Murphy & Presser, PC

(57) ABSTRACT

An information-processing device includes: a storage storing setting information including an operation setting for the information-processing device; a controller configured to operate according to the setting information stored in the storage; and an input-output interface to which a removable storage medium is connectable, the removable storage medium storing import setting information and import instruction information on importation of the import setting information, the import setting information being setting information for importation, the import setting information including a plurality of setting items. The controller is further configured to perform: (a) importing, while the removable storage medium is connected to the input-output interface, a designated setting item of the plurality of setting items into the storage in accordance with the import instruction information.

8 Claims, 12 Drawing Sheets

FIG. 2

SETTING INFORMATION (backup.json)

```
                                                            210
INSTALLATION SITE: Team1
CONTACT ADDRESS: team1@mail.co.jp IPAddress: 123.456.123.456
MailServer: 123.123.123.456

SCAN SETTINGS
   DISPLAY NAME: ScanToMike
   SCAN TRANSMISSION SETTING: URL: file://server1/share
   SCANNING RESOLUTION: 300dpi
   DUPLEX SCAN SETTING: ON
   COLOR SETTING: ON COPY SETTINGS
   DISPLAY NAME: Copy1
   SCANNING RESOLUTION: 200dpi
   DUPLEX SCAN SETTING: ON
   COLOR SETTING: ON
   DUPLEX PRINT SETTING: ON
```

FIG. 3A IMPORT INSTRUCTION INFORMATION ⎯250

SYNTAX OF CONDITIONAL SPECIFICATION

<VARIABLE NAME><RELATIONAL OPERATOR>[<VALUE> | <REGULAR EXPRESSION>]

FIG. 3B

| VARIABLE NAME | DESCRIPTION |
|---|---|
| ModelName | MODEL NUMBER<br>EX.: MFC-1111, DCP-2222, HL-3333, DS-4444 |
| SerialNumber | SERIAL NUMBER  EX.. 1234567890 |
| Operation | OPERATION TO DEVICE<br><br>EX.. Operation==Tenkey.1<br>TRUE IF TENKEY "1" IS BEING PRESSED<br><br>EX.. Operation==MainCover.Open<br>TRUE IF MAIN COVER IS OPEN |

FIG. 3C

| RELATIONAL OPERATOR | DESCRIPTION |
|---|---|
| == | TRUE IF L.H.S AND R.H.S ARE EQUAL |
| != | TRUE IF L.H.S AND R.H.S ARE NOT EQUAL |

FIG. 3D

| REGULAR EXPRESSION | DESCRIPTION |
|---|---|
| .* | MATCH ZERO OR MORE ANY CHARACTERS<br>EX. ModelName == /DS.*/<br>MATCHES "DS-4444"<br>BUT DOES NOT MATCH "MFC-1111" |

FIG. 3E
IMPORT INSTRUCTION INFORMATION
EXCLUSION SPECIFICATIONS:
SCAN SETTINGS, ModelName!=/DS.*/

FIG. 3F
IMPORT INSTRUCTION INFORMATION
EXCLUSION SPECIFICATIONS:
SCAN SETTINGS, SerialNumber==1234567890

FIG. 3G
IMPORT INSTRUCTION INFORMATION
EXCLUSION SPECIFICATIONS:
SCAN SETTINGS, Operation!=Tenkey.1

| No | FILE NAME DESCRIPTION | EXAMPLE | IMPORT TARGET MODEL OR DEVICE |
|---|---|---|---|
| 1 | import.txt | import.txt | ALL MODELS |
| 2 | import_model_<ModelName>.txt | import_model_MFC-1111.txt | MODEL OF "MFC-1111" |
| 3 | import_serial_<SerialNumber>.txt | import_serial_1234567890.txt | DEVICE WHOSE SERIAL NUMBER IS 1234567890 |

INFORMATION-PROCESSING DEVICE IMPORTING THEREIN SETTING INFORMATION STORED IN REMOVABLE STORAGE MEDIUM IN ACCORDANCE WITH SETTING INSTRUCTION INFORMATION STORED THEREIN TOGETHER WITH SETTING INFORMATION

CROSS REFERENCE TO RELATED APPLICATION

This application claims priority from Japanese Patent Application No. 2019-047058 filed Mar. 14, 2019. The entire content of the priority application is incorporated herein by reference.

TECHNICAL FIELD

The present disclosure relates to a technology for configuring setting information on an information-processing device based on setting information for importation acquired from an external storage device via an interface.

BACKGROUND

Japanese Patent Application Publication No. 2010-220121 describes an image-forming device that acquires setting information for importation from an external storage device via an interface. This image-forming device displays the acquired setting information for importation on a display device, enabling a user to choose what setting items to import from the displayed setting information. When the user selects a setting item, the image-forming device determines whether the selected setting item can be configured on the image-forming device. When the selected setting item can be configured on the image-forming device, the image-forming device configures the setting for the selected setting item.

SUMMARY

However, with the image-forming device described in the JP Publication '121, the user must perform troublesome operations for selecting setting items from the information displayed on the display device each time the user wishes to configure setting information on the image-forming device.

In view of the foregoing, it is an object of the present disclosure to provide a technology capable of facilitating the configuration of setting information to be imported into an information-processing device.

In order to attain the above and other objects, the disclosure provides an information-processing device including: a storage storing setting information including an operation setting for the information-processing device; a controller configured to operate according to the setting information stored in the storage; and an input-output interface to which a removable storage medium is connectable, the removable storage medium storing import setting information and import instruction information on importation of the import setting information, the import setting information being setting information for importation, the import setting information including a plurality of setting items. The controller is further configured to perform: (a) importing, while the removable storage medium is connected to the input-output interface, a designated setting item of the plurality of setting items into the storage in accordance with the import instruction information.

According to another aspect, the disclosure provides a method of importing setting information into an information-processing device, the setting information including an operation setting for the information-processing device, the information-processing device comprising an input-output interface to which a removable storage medium is connectable, the removable storage medium storing import setting information and import instruction information on importation of the import setting information, the import setting information being setting information for importation, the import setting information including a plurality of setting items, the method comprising: importing, while the removable storage medium is connected to the input-output interface, a designated setting item of the plurality of setting items into the information-processing device in accordance with the import instruction information.

According to still another aspect, the present disclosure provides an information-processing device including: a storage storing setting information including an operation setting for the information-processing device; a controller configured to operate according to the setting information stored in the storage; and an input-output interface to which a removable storage medium is connectable, the removable storage medium storing import setting information and import instruction information on importation of the import setting information, the import setting information being setting information for importation, the import setting information including a plurality of setting items. The controller is further configured to perform: (a) importing, while the removable storage medium is connected to the input-output interface, one or more designated setting items of the plurality of setting items into the storage in accordance with the import instruction information.

BRIEF DESCRIPTION OF THE DRAWINGS

The particular features and advantages of the disclosure as well as other objects will become apparent from the following description taken in connection with the accompanying drawings, in which:

FIG. 2 illustrates an example of setting information stored in a USB memory shown in FIG. 1;

FIGS. 3A-3G illustrate examples of import instruction information stored in the USB memory shown in FIG. 1;

DETAILED DESCRIPTION

An information-processing device according to one embodiment of the present disclosure will be described while referring to the accompanying drawings.

Figure 1:
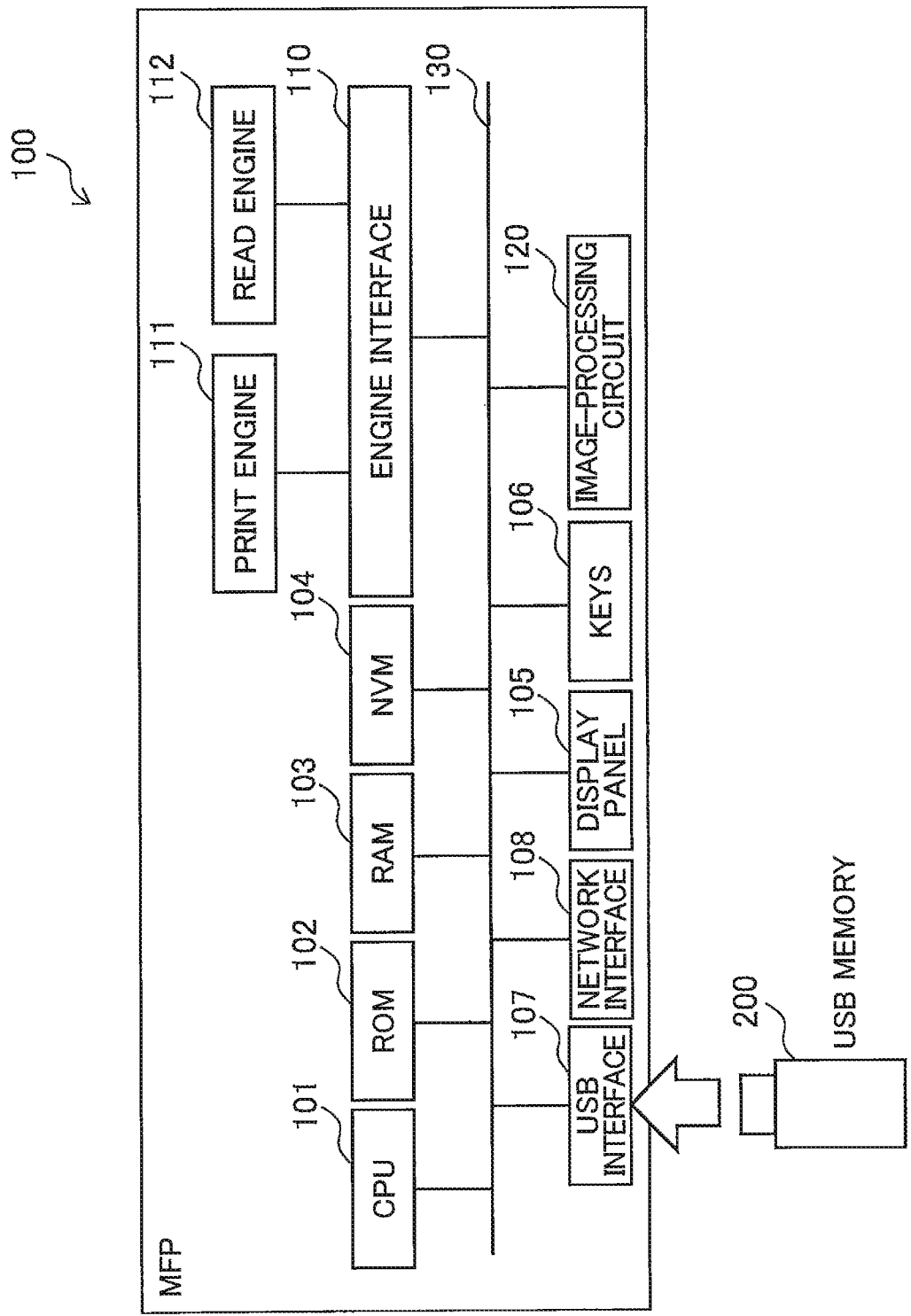
FIG. 1 is a block diagram showing a control structure of an MFP (multifunction peripheral) is an example of the information-processing device according to the embodiment of the present disclosure.

FIG. 1 is a block diagram showing a control structure of a multifunction peripheral 100 that is an example of the information-processing device according to the embodiment of the present disclosure. Hereinafter, the multifunction peripheral 100 will be abbreviated as the MFP 100.

As shown in FIG. 1, the MFP 100 is provided with a central processing unit (CPU) 101, a read-only memory (ROM) 102, a random-access memory (RAM) 103, and a non-volatile memory (NVM) 104.

The CPU 101 handles overall control of the MFP 100. In the embodiment, the CPU 101 controls a print engine 111 and a read engine 112 via an engine interface 110 in accordance with setting information. The setting information, the engine interface 110, the print engine 111, and the read engine 112 will be described later.

The ROM 102 is a memory that stores a control program executed by the CPU 101. The CPU 101 executes various processes by reading the control program stored in the ROM 102.

The RAM 103 is a memory that temporarily stores image data and the like. The CPU 101 also uses the RAM 103 as a storage area for temporarily storing data, signals, and the like used for executing the control program or as a work area for data processing.

The NVM 104 is a non-volatile memory for storing setting information and the like.

The MFP 100 is further provided with a display panel 105, and keys 106.

The display panel 105 is a touchscreen in the present embodiment. Various screens are displayed on the display panel 105 based on the status of the MFP 100. The user can perform input operations on the display panel 105 by pressing input buttons (not shown) displayed in the screens.

The keys 106 are hard keys, i.e., keys configured in hardware. Some typical examples of hard keys include a power switch and a reset switch (both of which are not shown in the drawings).

The MFP 100 is further provided with a Universal Serial Bus (USB) interface 107, and a network interface 108.

The USB interface 107 is an input-output (I/O) interface for connecting the MFP 100 to an external USB device. In the present embodiment, a USB memory 200 that is removable media is connected to the USB interface 107. The USB memory is a removable data storage and is also called USB flash memory or a USB flash drive.

The network interface 108 functions to connect the MFP 100 to a communication network. The communication network is a wired or wireless local area network (LAN). The network interface 108 may be one or both of a LAN interface and a wireless LAN (WLAN) interface.

The MFP 100 is also provided with the engine interface 110. The print engine 111 and the read engine 112 are connected to the engine interface 110.

The print engine 111 functions to print images on sheets and includes a printing device, such as an electrophotographic type printing device, inkjet type printing device, or thermal type printing device.

The read engine 112 functions to read images from originals and includes a reading device, such as charge-coupled devices (CCDs) or a contact image sensor (CIS).

The engine interface 110 is a control circuit for controlling the print engine 111 and the read engine 112. The engine interface 110 is an interface for controlling the print engine 111 and read engine 112. The CPU 101 controls the print engine 111 and the read engine 112 through the engine interface 110.

The MFP 100 is also provided with an image-processing circuit 120. The image-processing circuit 120 executes a rasterization process on image data for a print job, and outputs the rasterized data to the print engine 111. The image-processing circuit 120 also converts image data read from an original by the read engine 112 to digital data. The converted digital data may then be transmitted externally via the network interface 108 or supplied to the print engine 111 to be outputted onto sheets.

The CPU 101, the ROM 102, the RAM 103, the NVM 104, the display panel 105, the keys 106, the USB interface 107, the network interface 108, the engine interface 110, and the image-processing circuit 120 are all interconnected via a bus 130.

In the present embodiment, setting information stored in the nonvolatile memory 104 of the MFP 100 can be exported to the USB memory 200 connected to the MFP 100 via the USB interface 107. When the USB memory 200 is subsequently connected to a different MFP, the exported setting information can be imported into the other MFP. Note that all of the MFPs used in the embodiment (an MFP 100a, an MFP 100b, and an MFP 100c described later) have the same configuration as the MFP 100. In the present embodiment, the MFP 100a is the source from which setting information is exported. All or some of the setting items in the exported setting information are selected, and then the selected setting items are imported into the MFP 100b and MFP 100c.

FIG. 2 shows an example of setting information 210 for importation (hereinafter, also called "import setting information 210") that is stored in the USB memory 200. For example, the import setting information 210 shown in FIG. 2 is setting information that has been exported from the nonvolatile memory 104 of the MFP 100a to the USB memory 200. When exported to the USB memory 200, the setting information 210 is stored in the JavaScript (registered trademark) Object Notation (JSON) format in the present embodiment. Naturally, the format in which setting information is stored is not limited to JSON, but may be another format such as the comma-separated values (CSV) format.

The import setting information 210 is stored in the USB memory 200 under the filename "backup.json," for example.

The import setting information 210 in the example of FIG. 2 includes the installation site "Team1" for the MFP 100a, the contact address "team1@mail.co.jp" for the user of the MFP 100a, the IP address "123.456.123.456" of the MFP 100a, the IP address "123.123.123.456" of the mail server, scan settings, and copy settings.

The scan settings are settings for processes involving the read engine 112. The scan settings in the example of FIG. 2 include the display name "ScanToMike," the scan transmission setting "file://server1/share," the scanning resolution "300 dpi," the duplex scan setting "On," and the color setting "On."

The display name is information for displaying a configuration name on the display panel 105 of the MFP 100a.

The scan transmission setting is an address for transmitting image data of a scanned image to a communication network via the network interface 108. The scan transmission setting is not limited to the URL shown in FIG. 2, but may be an IP address or an e-mail address.

The duplex scan setting is an option for scanning images from both surfaces of an original. A duplex scan setting of "ON" indicates that the option is enabled, while a setting of "OFF" indicates that the option is disabled and signifies a setting for scanning an image from only one surface of the original.

The color setting is an option for reading color images from the original. A color setting of "ON" indicates that the option is enabled, while a setting of "OFF" indicates that the option is disabled and signifies a setting to read images in monochrome from the original.

The CPU 101 displays "ScanToMike" on the panel 105 as the configuration name based on the setting "Display name: ScanToMike." Here, the setting information 210 of FIG. 2 described above that corresponds to "Display name: ScanToMike" indicates setting information for settings that the user can select from a plurality of settings displayed on the panel 105. However, the present disclosure is not limited to this configuration, and the setting information may be for settings that are fixed for an MFP. "Fixed" denotes that the user is restricted or prohibited from selecting other settings.

The CPU 101 transmits image data of an image read by the read engine 112 to the URL file://server1/share based on the scan transmission setting "URL:file://server1/share." The CPU 101 controls the read engine 112 to read an image at a resolution of 300 dpi based on the scanning resolution "300 dpi." The CPU 101 controls the read engine 112 to read images from both surfaces of the original based on the duplex scan setting "On." The CPU 101 controls the read engine 112 to read color images from both surfaces of the original based on the color setting "On."

Copy settings are settings for processes involving the read engine 112 and the print engine 111. In the example of FIG. 2, the copy settings include the display name "Copy1," the scanning resolution "200 dpi," the duplex scan setting "ON," the color setting "ON," and the duplex print setting "ON."

The color setting indicates an option for forming color images on sheets. A setting of "ON" indicates that the option is enabled, while a setting of "OFF" indicates that the option is disabled and signifies a setting for forming monochromatic images on sheets.

The duplex print setting is an option for forming images on both surfaces of a sheet. A setting of "ON" indicates that the option is enabled, while a setting of "OFF" indicates that the option is disabled and signifies a setting for forming images on only one surface of the sheets.

The CPU 101 controls the print engine 111 to form color images on sheets based on the copy setting "Color: On." The CPU 101 controls the print engine 111 to form images on both surfaces of sheets based on the copy setting "Duplex print setting: On."

FIG. 3 shows an example of import instruction information 250 stored in the USB memory 200.

The import instruction information 250 is information prescribing instructions regarding importation of the import setting information 210, which is exported from MFP 100a to the USB memory 200 and then stored in the USB memory 200, into another MFP such as the MFP 100b or MFP 100c. That is, the MFP 100b and MFP 100c import one or more setting items included in the import setting information 210 in accordance with the instructions prescribed in the import instruction information 250. Each of the one or more setting items of the import setting information 210 which are imported in accordance with the import instruction information 250 is the claimed "designated setting item".

The import instruction information 250 may include selection specifications, exclusion specifications, replacement specifications (see FIGS. 4 through 6), and condition specifications. The selection specifications, exclusion specifications, and replacement specifications are given a higher priority than that given to the condition specifications included in the import instruction information 250 shown in FIGS. 3A-3G. The condition specifications are used when the import setting information 210 stored in the USB memory 200 is to be imported into a special MFP or imported when a special operation is performed.

FIG. 3A shows sample syntax of a conditional specification that can be used in the import instruction information 250. In the example of FIG. 3A, the conditional specification includes a variable name, a relational operator, a value, and a regular expression.

FIG. 3B shows variable names that can be used in the conditional syntax and a description of the names FIG. 3C shows relational operators that can be used in the conditional syntax and a description of the operators. FIG. 3D shows regular expressions that can be used in the conditional syntax and descriptions of these expressions. FIGS. 3E through 3G will be referenced later when describing a condition determination process in FIG. 10.

Figure 4:
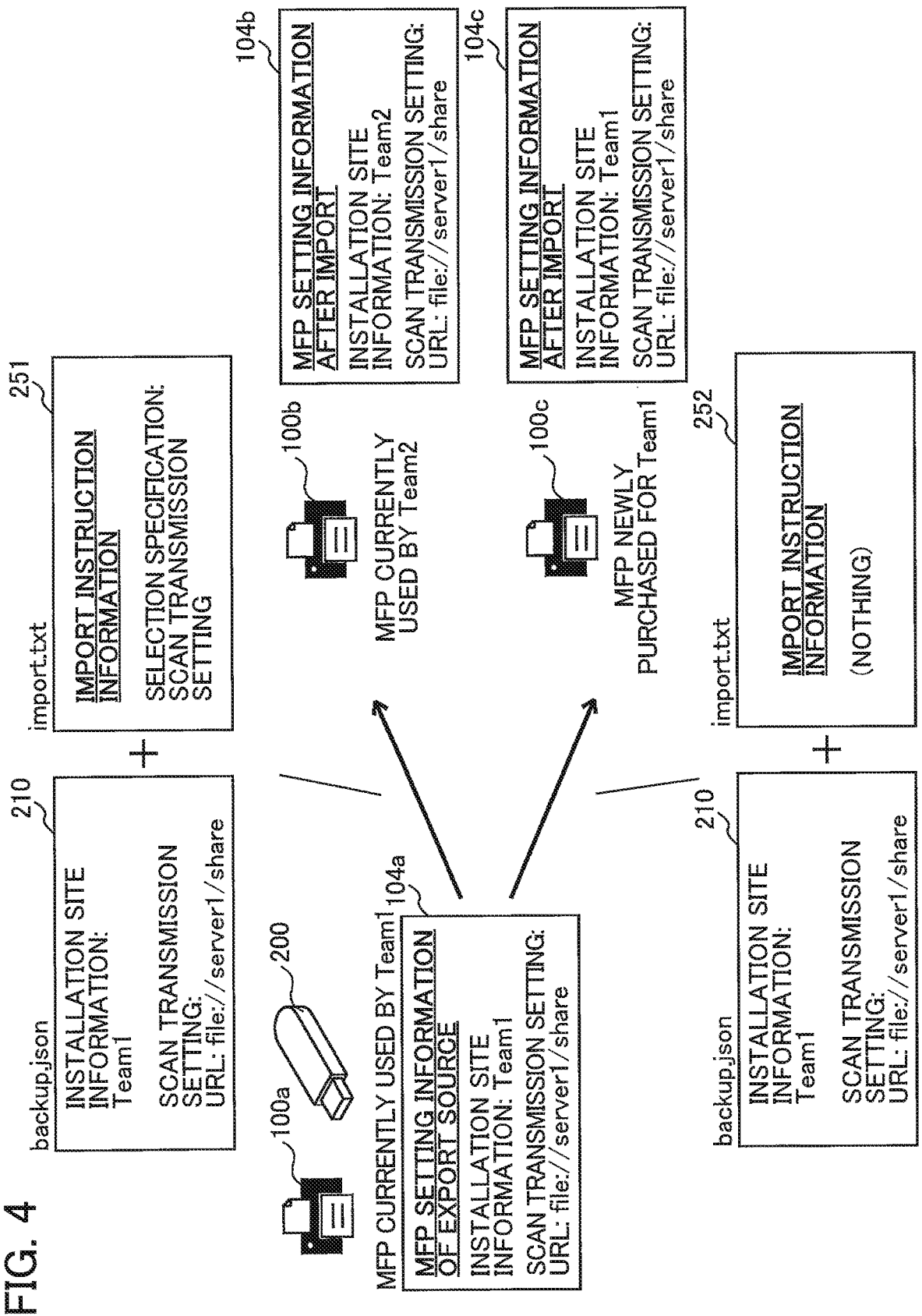
FIG. 4 is a diagram for describing how setting information imported into an MFP is changed depending on whether the import instruction information includes a selection specification.

FIG. 4 is a diagram for describing how setting information exported from the MFP 100a and stored in the USB memory 200 is imported into other MFPs 100b and 100c based on whether the import instruction information includes a selection specification.

In FIG. 4 the MFP 100a is currently being used by Team 1 and is located near the workplace for personnel of Team 1. Setting information is stored in the nonvolatile memory 104a of the MFP 100a. If the USB memory 200 is connected to the MFP 100a via the USB interface 107a and an export command is issued in this state, the MFP 100a reads the setting information from the nonvolatile memory 104a and stores a backup.json file having this setting information in the USB memory 200 as the import setting information 210.

An import.txt file that is the import instruction information 250 is also stored in the USB memory 200. The user may create the import instruction information 250 using the MFP 100a or a different device, such as a PC (not shown). The import.txt file is a file in the text format.

Accordingly, the import setting information 210 and the import instruction information 250 are stored in the USB memory 200 as the backup.json file and the import.txt file, respectively.

The import instruction information for the MFP 100b will be called import instruction information 251 in FIG. 4. The import instruction information 251 includes a selection specification "Selection specification: scan transmission setting." When a selection specification is included in the import instruction information 251, the MFP 100b imports one or more setting items corresponding to the selection specification (i.e., one or more setting items selected in accordance with the selection specification) into the nonvolatile memory 104b. The selection specification is an example of the claimed "selection instruction." Each of the one or more setting items selected in accordance with the selection specification is an example of the claimed "specific setting item".

When the USB memory 200 storing the import setting information 210 and import instruction information 251 exported from the MFP 100a is connected to the USB interface 107b of the MFP 100b and a prescribed process is executed, the MFP 100b stores setting information in the nonvolatile memory 104b based on the import setting information 210 and import instruction information 251.

Hence, an import denotes that setting information is stored in the nonvolatile memory 104b of the MFP 100b based on the import setting information 210 and import instruction information 251 stored in the USB memory 200, for example.

Thereafter, in accordance with the setting information that has been imported and stored in the nonvolatile memory 104b, the CPU 101b of the MFP 100b controls the print engine 111b, read engine 112b, image-processing circuit 120b, network interface 108b, and the like to execute copy jobs, scan jobs, transmission jobs, and the like.

The MFP 100b is currently being used by Team 2 and is located in the vicinity of the workplace for personnel of Team 2. Setting information configured on the MFP 100b side is stored in the nonvolatile memory 104b of the MFP 100b. Since the setting item designated by the selection specification in the import instruction information 251 is the scan transmission setting, only the scan transmissions setting (URL: file://server1/share) is imported into the MFP 100b from the import setting information 210, and all other setting items are left unchanged at the current setting information on the MFP 100b. Therefore, the installation site information is maintained as "Team2."

On the other hand, in a case where the import setting information 210 is imported into the MFP 100c that has been newly purchased for Team 1, it is desirable to import all of the import setting information 210 as is into the MFP 100c since the MFP 100c is configured with the factory default settings. Thus, in this case, import instruction information that does not include a selection specification is stored in the USB memory 200 as import instruction information 252 for the MFP 100c. When the import instruction information 252 does not have a selection specification, the MFP 100c imports all setting items into the nonvolatile memory 104c. Consequently, the import setting information 210 in the USB memory 200 is stored unchanged in the nonvolatile memory 104c as setting information for the MFP 100c.

Figure 5:
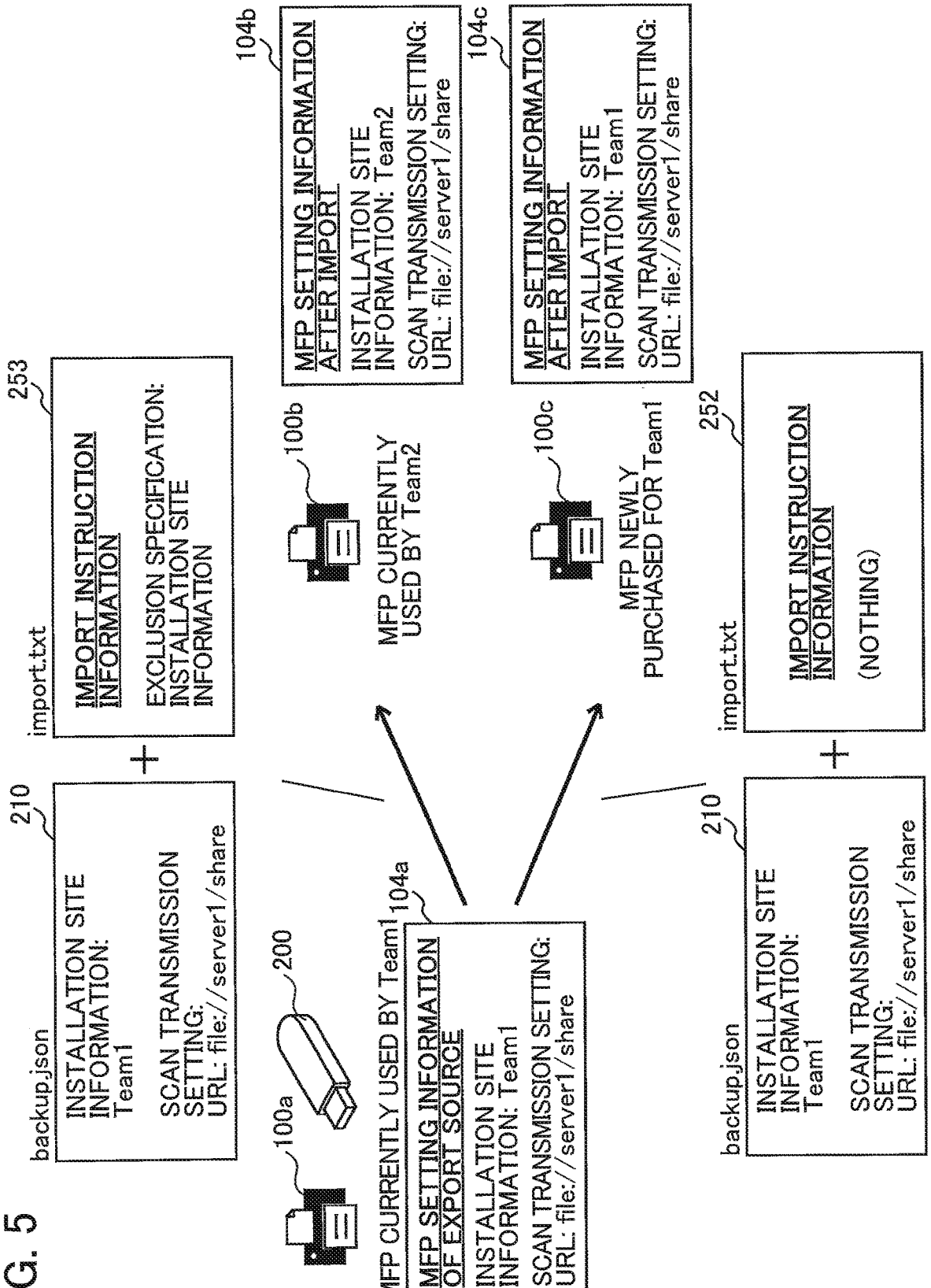
FIG. 5 is a diagram for describing how setting information imported into an MFP is changed depending on whether the import instruction information includes an exclusion specification.

FIG. 5 is a diagram for describing how setting information exported from the MFP 100a and stored in the USB memory 200 is imported into other MFPs 100b and 100c based on whether the import instruction information includes an exclusion specification. Devices and components in FIG. 5 having the same structure as those in FIG. 4 are designated with the same reference numerals to avoid duplicating description.

In FIG. 5, the import instruction information for the MFP 100b will be called import instruction information 253. The import instruction information 253 includes an exclusion specification "Exclusion specification: installation site information." When an exclusion specification is included in the import instruction information 253, the MFP 100b imports one or more setting items, excluding one or more setting items corresponding to the exclusion specification, into the nonvolatile memory 104b. That is, one or more setting items that remain after one or more setting items are excluded in accordance with the exclusion specification are imported into the nonvolatile memory 104b. The exclusion specification is an example of the claimed "exclusion instruction." Each of the one or more setting items excluded in accordance with the exclusion specification is an example of the claimed "specific setting item".

When the USB memory 200 storing the import setting information 210 and the import instruction information 253 is connected to the USB interface 107b of the MFP 100b, the MFP 100b stores setting information in the nonvolatile memory 104b based on the import setting information 210 and import instruction information 253.

Here, Team 2 is currently using the MFP 100b, and setting information configured on the MFP 100b side is stored in the nonvolatile memory 104b of the MFP 100b. Thus, the MFP 100b imports all of the import setting information 210 stored in the USB memory 200, excluding the setting items specified in the exclusion specification, i.e., the installation site information in this case, while maintaining the excluded setting items at their current setting. Hence, the installation site information remains "Team 2."

Figure 6:
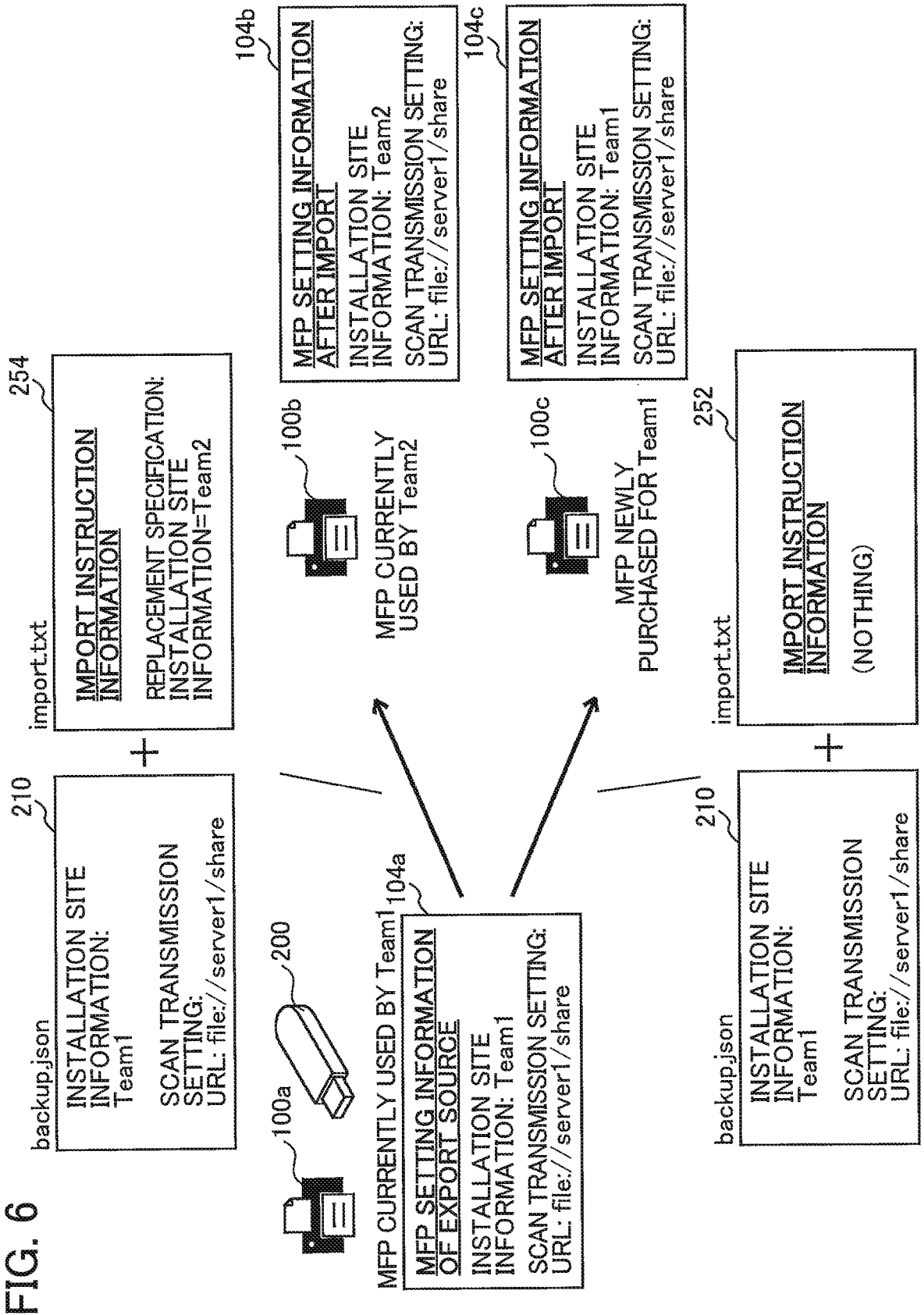
FIG. 6 is a diagram for describing how setting information imported into an MFP is changed depending on whether the import instruction information includes a replacement specification.

FIG. 6 is a diagram for describing how setting information exported from the MFP 100a and stored in the USB memory 200 is imported into other MFPs 100b and 100c based on whether the import instruction information includes a replacement specification. Devices and components in FIG. 6 having the same structure as those in FIG. 4 are designated with the same reference numerals to avoid duplicating description.

In FIG. 6, the import instruction information for the MFP 100b will be called import instruction information 254. The import instruction information 254A includes a replacement specification "Replacement specification: installation site information=Team2." A replacement specification includes a setting item that is the target of replacement, and the new value for that setting item. In this example, installation site information is the target setting item for replacement, and Team2 is the value to be set for the target setting item in place of the current value. The replacement specification is an example of the claimed "replacement instruction." The setting item targeted for replacement in accordance with the replacement specification is an example of the claimed "specific setting item". The value to be set for the setting item targeted for replacement is an example of the claimed "designated value".

When the USB memory 200 storing the import setting information 210 and import instruction information 254 is connected to the USB interface 107b of the MFP 100b, the MFP 100b stores setting information in the nonvolatile memory 104b based on the import setting information 210 and import instruction information 254.

Here, Team 2 is currently using the MFP 100b, and setting information configured on the MFP 100b side is stored in the nonvolatile memory 104b of the MFP 100b. Thus, the MFP 100b imports the import setting information 210 stored in the USB memory 200, while overwriting the setting item specified for replacement, i.e., the value for the installation site information in this case, with "Team2." In other words, only the installation site information in the import setting information 210 is replaced with "Team2" while all other information is imported as is into the MFP 100b. Consequently, the installation site information is maintained at "Team2."

FIGS. 7A-7E are diagrams for describing where a replaceable region of setting information is when a selection specification or an exclusion specification is combined with a replacement specification.

Figure 7A:
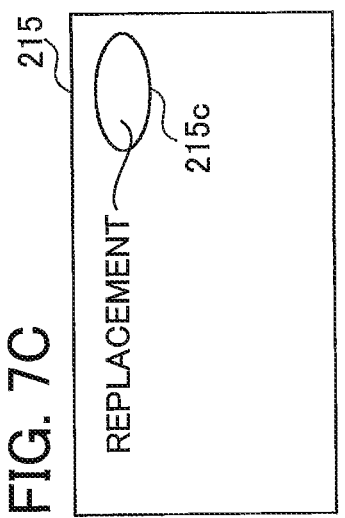
FIGS. 7A-7E are diagrams for describing where a replaceable region of setting information is when a selection specification or an exclusion specification is combined with a replacement specification.

FIG. 7A shows the selectable region of setting information when a selection specification has been set (i.e., included) in the import instruction information. In this example, all setting information falls within a rectangular frame 215 and one or more setting items specified by a selection specification fall in an ellipse 215a labeled "Selection." Accordingly, the one or more setting items of setting information inside the ellipse 215a are selected and imported.

Figure 7B:
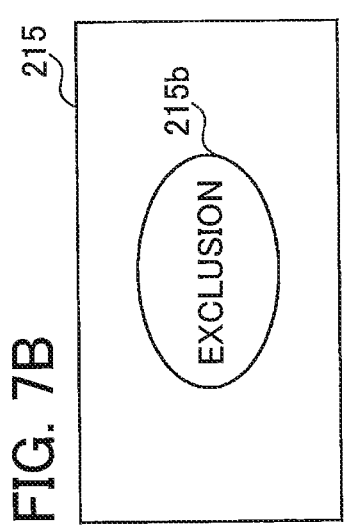

FIG. 7B shows an excludable region of setting information when an exclusion specification has been set (i.e., included) in the import instruction information. In this example, one or more setting items specified by an exclusion specification fall within an ellipse 215b labeled "Exclusion." Accordingly, the one or more setting items of the setting information inside the ellipse 215b are excluded from importation, while one or more setting items of the setting information inside the remaining portion of the rectangular frame 215 other than the ellipse 215b are imported.

Figure 7C:
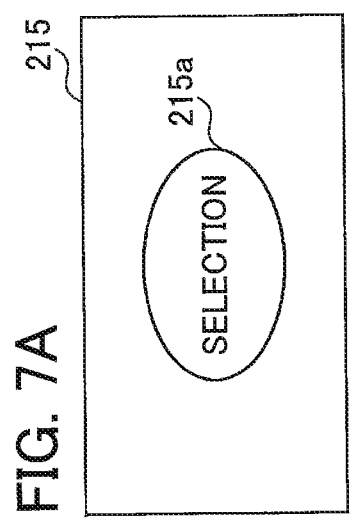

FIG. 7C shows a replaceable region of setting information when a replacement specification has been set (i.e., included) in the import instruction information. In this example, one or more setting items specified by a replacement specification fall inside an ellipse 215c labeled "Replacement." Accordingly, the one or more setting items of the setting information inside the ellipse 215c are replaced and imported.

Figure 7D:
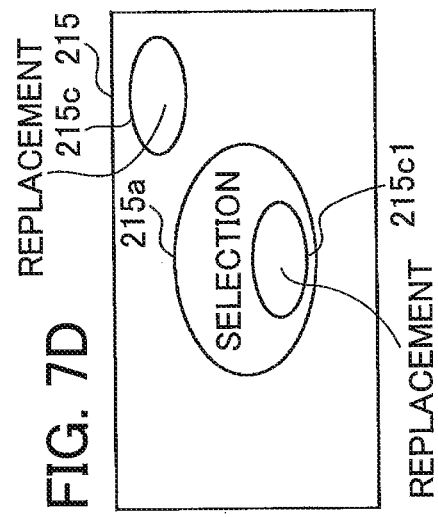

FIG. 7D shows replaceable regions of setting information when a selection specification is combined with replacement specifications. As described above, a replacement specification specifies one or more setting items in the setting information that are targeted for replacement and indicates the replacement content. Accordingly, replacement can be made not only for one or more setting items within an ellipse 215c1 located inside the selectable region (i.e., the ellipse 215a), but also within the ellipse 215c located outside the selectable region.

Figure 7E:
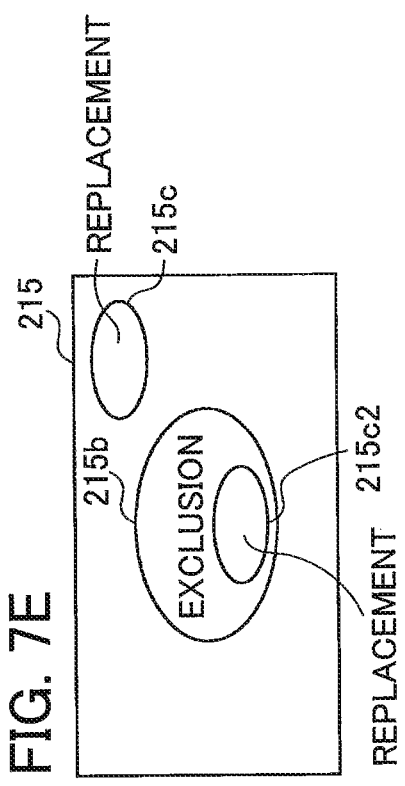

FIG. 7E shows an excludable region of setting information when an exclusion specification is combined with replacement specifications. As described above, a replacement specification specifies one or more setting items of setting information that are targeted for replacement, as well as the replacement content. Accordingly, replacement can be made not only for one or more setting items within the ellipse 215c located outside the exclusion region (i.e., the ellipse 215b), but also within an ellipse 215c2 located inside the exclusion region.

Figure 8:
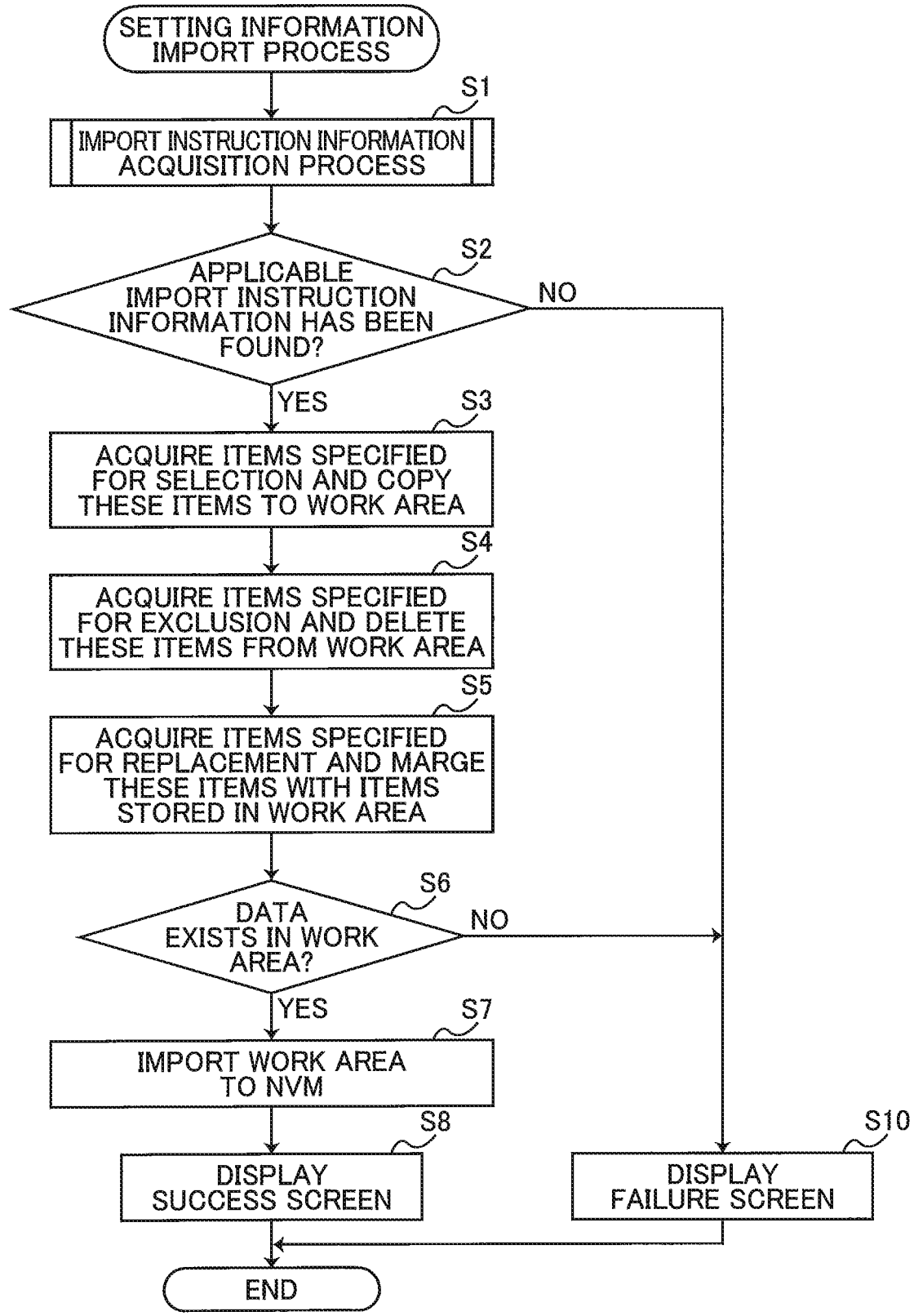
FIG. 8 is a flowchart illustrating steps in a setting information import process executed by the MFP shown in FIG. 1, and particularly by a CPU of the MFP.

FIG. 8 illustrates steps in a setting information import process. The CPU 101 starts the setting information import process when detecting that the USB memory 200 has been connected to the USB interface 107b of the MFP 100b. In the following description, the term "step" indicating a step in the process is abbreviated as "S".

In S1 of FIG. 8, the CPU 101 first performs an import instruction information acquisition process to acquire import instruction information. The CPU 101 executes the import instruction information acquisition process based on the filename of the import instruction information 250. In the setting information import process, it will be assumed that a file whose filename includes the character string "import" is stored in the USB memory 200 as the import instruction information 250.

Figure 9:
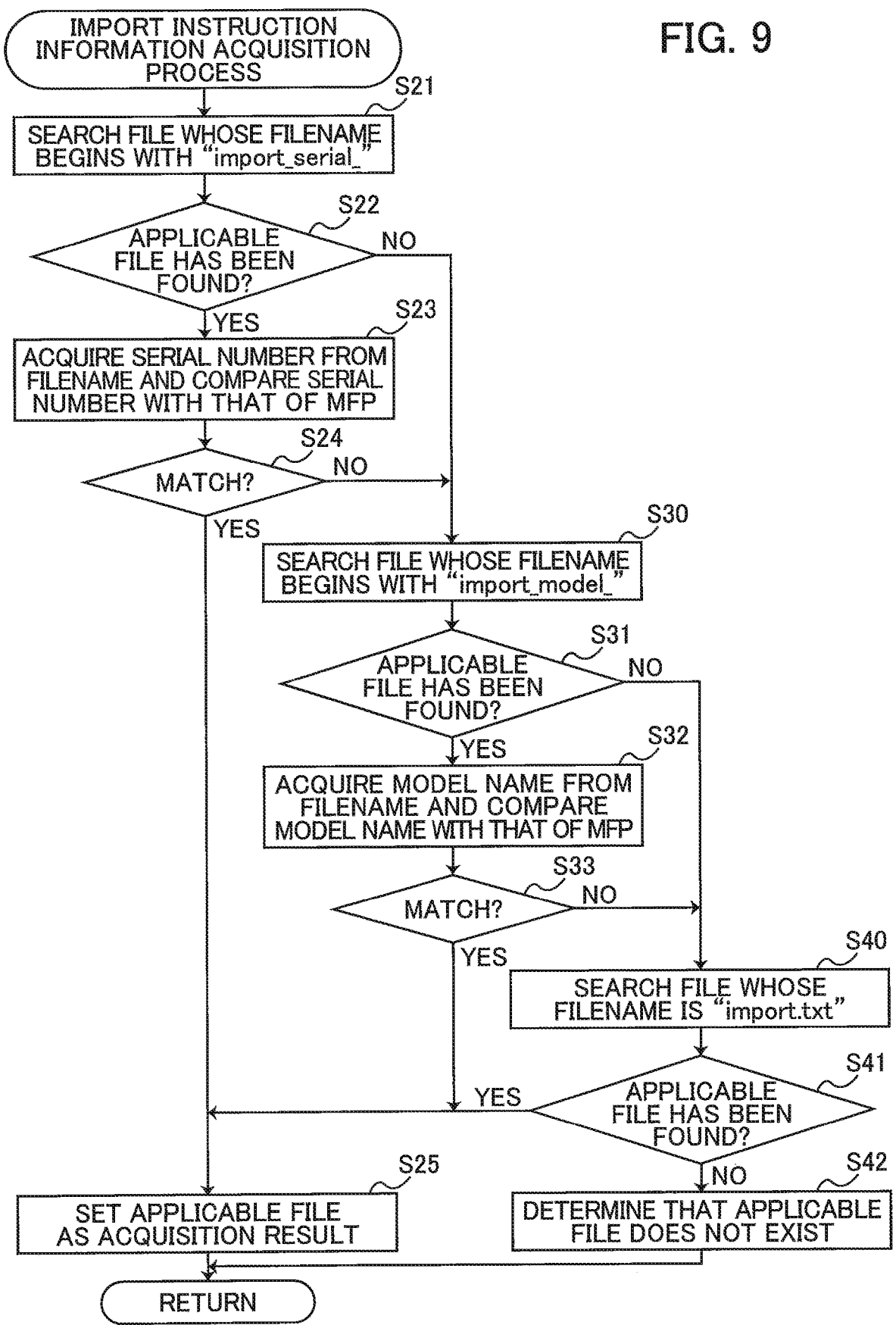
FIG. 9 is a flowchart illustrating detailed steps in an import instruction information acquisition process included in the setting information import process shown in FIG. 8.
Figures 11A, 11B:
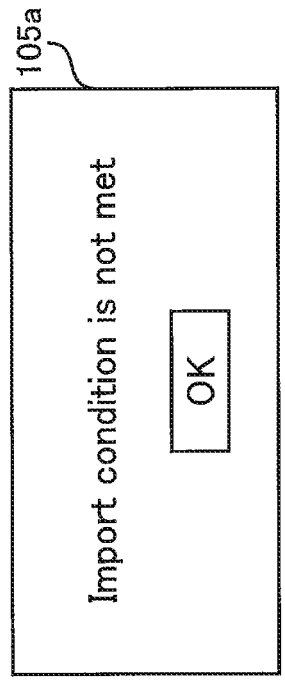
FIG. 11A illustrates sample description formats for the filename of the import instruction information.
FIG. 11B illustrates an example of a failure screen.

FIG. 9 illustrates detailed steps in the import instruction information acquisition process. In S21 of FIG. 9, the CPU 101 first searches for a file having a filename that begins with "import_serial_" in the USB memory 200. FIG. 11A shows sample description formats for the filename of the import instruction information 250.

As shown in FIG. 11A, the filename for the import instruction information 250 may include the model name or the serial number of the MFP. The model name is model information whose value is the same for MFPs with the same specifications. That is, the same model name (i.e., the same model information) is assigned to MFPs having the same specifications. The serial number is unique information whose value is a unique value for an individual MFP. The serial number (i.e., the unique information) is assigned to each individual MFP. The import instruction information 250 having a filename that includes the model name or serial number may be stored in the USB memory 200 together with the import setting information 210.

If a USB memory 200 storing import instruction information 250 having a filename that includes a model name or serial number is connected to the MFP targeted for importation of setting information, the import setting information 210 stored in the USB memory 200 is imported into the MFP when the model name or serial number in the filename of the import instruction information 250 matches the model name or serial number of the target MFP. When the filename of the import instruction information 250 does not include either a model name or a serial number, the import setting information 210 may be imported into all MFPs.

The search performed in S21 (as with searches in S30 and S40 described later) is performed to determine whether the import setting information 210 stored in the USB memory 200 can be imported into the MFP to which the USB memory 200 is connected. Note that the USB memory 200 may store a single backup.json file as the import setting information 210, and a plurality of files with different names as the import instruction information 250.

In S22 the CPU 101 determines whether an applicable file has been found in the search of S21. When the CPU 101 determines that an applicable file has been found (S22: YES), in S23 the CPU 101 acquires the serial number from the filename of the applicable file and compares the acquired serial number with that of the MFP 100b.

In S24 the CPU 101 determines whether the serial numbers match. When the CPU 101 determines that the serial numbers match (S24: YES), in S25 the CPU 101 sets the applicable file as the acquisition result and ends the import instruction information acquisition process (returns).

However, when the CPU 101 determines in S22 that an applicable file has not been found (S22: NO) or determines in S24 that the serial numbers do not match (S24: NO), in S30 the CPU 101 searches for a file having a filename that begins with "import_model_".

In S31 the CPU 101 determines whether an applicable file has been found in the search of S30. When the CPU 101 determines that an applicable file has been found (S31: YES), in S32 the CPU 101 acquires the model name from the filename of the applicable file and compares the acquired model name to that of the MFP 100b.

In S33 the CPU 101 determines whether the model names match.

When the CPU 101 determines that the model names match (S33: YES), the CPU 101 advances to S25. Since the process of S25 has been described above, a description of this process will not be repeated here.

On the other hand, when the CPU 101 determines in S31 that an applicable file has not been found (S31: NO) or determines in S33 that the model names do not match (S33: NO), in S40 the CPU 101 searches for a file having the filename "import.txt".

In S41 the CPU 101 determines whether an applicable file has been found in the search of S40. When the CPU 101 determines that an applicable file has been found (S41: YES), the CPU 101 advances to S25 described above.

When the CPU 101 determines that an applicable file has not been found (S41: NO), in S42 the CPU 101 determines that an applicable file does not exist and ends the import instruction information acquisition process (returns).

Returning to FIG. 8, in S2 the CPU 101 determines whether applicable import instruction information 250 has been found. When the CPU 101 determines that applicable import instruction information 250 has been found (S2: YES), in S3 the CPU 101 acquires, from the import setting information 210, one or more setting items that are specified by a selection specification included in the import instruction information 250 and copies these setting items to the work area in the RAM 103.

In S4 the CPU 101 acquires, from the import setting information 210, one or more setting items that are specified by an exclusion specification included in the import instruction information 250, and deletes those setting items from the work area in the RAM 103.

In S5 the CPU 101 acquires, from the import setting information 210, one or more setting items specified by a replacement specification included in the import instruction information 250, copies these setting items to the work area of the RAM 103, and replaces the value of each of the copied setting items with a corresponding one of the values designated by the replacement specification.

Note that when a condition specification has been set for any of the setting item designated by the selection specification, the exclusion specification, or the replacement specification (see FIG. 3A), in S3-S5 the CPU 101 determines whether the specified condition matches the condition of the MFP 100b. When the conditions match, the CPU 101 acquires the relevant setting item from the import setting information 210. However, when the conditions do not match, the CPU 101 skips this setting item and proceeds to process the next setting item.

In some cases, in S3-S5 the import instruction information 250 does not include one or more of the selection specification, exclusion specification, and replacement specification. In such a case, the CPU 101 skips one or more steps corresponding the one or more specifications not included in the import instruction information 250 and advances to the next step.

The process of S5 must be performed after performing the processes in S3 and S4 (in other words, as the last step in S3-S5) in order that the replacement process can be performed in the regions described in FIGS. 7D and 7E. For example, if a replacement were performed within the ellipse 215c1 of the selection region shown in FIG. 7D and a selection were performed after this replacement, the replaced setting items in the setting information would be replaced (overwritten) with the selected setting items.

Figure 10:
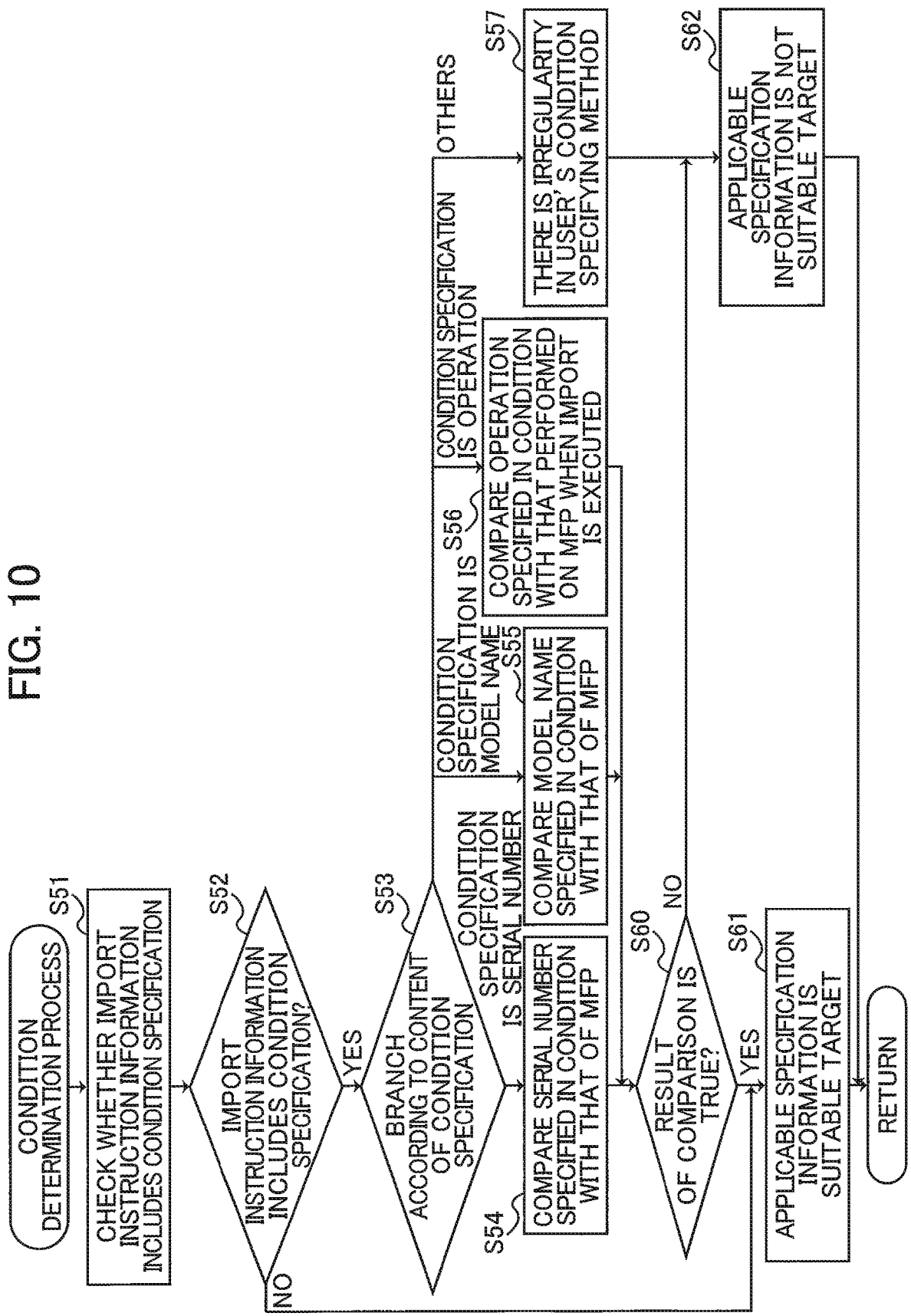
FIG. 10 is a flowchart illustrating detailed steps in a condition determination process included in the setting information import process shown in FIG. 8.

FIG. 10 illustrates steps in a condition determination process. The condition determination process is executed in S3-S5 when a condition specification is set for any of the setting items designated by a selection specification, an exclusion specification, or a replacement specification, as described above.

In S51 of FIG. 10, the CPU 101 first checks whether the import instruction information 250 includes a condition specification.

In S52 the CPU 101 determines whether a condition specification is included in the import instruction information 250 based on the results in S51. When the CPU 101 determines that the import instruction information 250 includes a condition specification (S52: YES), in S53 the CPU 101 branches to a process corresponding to the content of the condition specification.

When a serial number is set in the syntax of the condition specification, the CPU 101 advances from S53 to S54. In S54 the CPU 101 compares the serial number specified in the condition specification with the serial number of the MFP 100b and advances to S60. The process in S54 is performed when a USB memory 200 storing the import instruction information 250 shown in FIG. 3F is connected to the MFP 100. In the example of FIG. 3F, an MFP having the serial number "1234567890" imports thereinto the import setting information 210 while excluding the scan settings.

When a model name is set in the syntax of the condition specification, the CPU 101 advances from S53 to S55. In S55 the CPU 101 compares the model name specified in the condition specification with the model name of the MFP 100b, and subsequently advances to S60. The process of S55 is performed when a USB memory 200 storing the import instruction information 250 shown in FIG. 3E is connected to the MFP 100. In the example of FIG. 3E, when the model name of an MFP does not begin with "DS", that MFP imports thereinto the import setting information 210 while excluding scan settings. In this way, according to the present embodiment, importation can be performed only to models which the user actually uses, thereby preventing the spread of personal information.

When an operation is set in the syntax of the condition specification, the CPU 101 advances from S53 to S56. In S56 the CPU 101 compares the operation specified in the condition specification with the operation performed on the MFP 100b when the import is executed, and subsequently advances to S60. The process of S56 is performed when a USB memory 200 storing the import instruction information shown in FIG. 3G is connected to the MFP 100. In the example of FIG. 3G, the import setting information 210 is imported while excluding the scan settings only if the import is executed while the "1" key in the numerical keypad is pressed. The operation specified in the condition specification is an example of the claimed "specific operation".

When the syntax of the condition specification does not include any of the serial number, model name, and operation, the CPU 101 advances from S53 to S57. In S57 the CPU 101 determines that there is an irregularity in the user's condition specifying method and subsequently advances to S62.

In S60 the CPU 101 determines whether the result of the comparison is true. When the comparison result is true (S60: YES), in S61 the CPU 101 determines that the setting item that is currently targeted for the condition determination process is a suitable target for the import, and subsequently ends the condition determination process (returns).

However, if the CPU 101 determines in S60 that the comparison result is false (S60: NO) or after performing the process of S57, in S62 the CPU 101 determines that the setting item that is currently targeted for the condition determination process is not a suitable target for the import, and subsequently ends the condition determination process (returns).

Returning to FIG. 8, in S6 the CPU 101 determines whether data acquired from the import setting information 210 exists in the work area of the RAM 103. When the CPU 101 determines that data is present in the work area (S6: YES), in S7 the CPU 101 imports the data from the work area to the nonvolatile memory 104b of the MFP 100b. In S8 the CPU 101 displays a success screen on the display panel 105 indicating that the import has been successful, and subsequently ends the setting information import process.

However, when the CPU 101 determines in S2 that an applicable import instruction information 250 has not been found (S2: NO) or when the CPU 101 determines in S6 that no data exists in the work area (S6: NO), in S10 the CPU 101 displays a failure screen on the display panel 105 indicating that the import failed, and subsequently ends the setting information import process. FIG. 11B shows an example of a failure screen 105a.

Figure 12A:
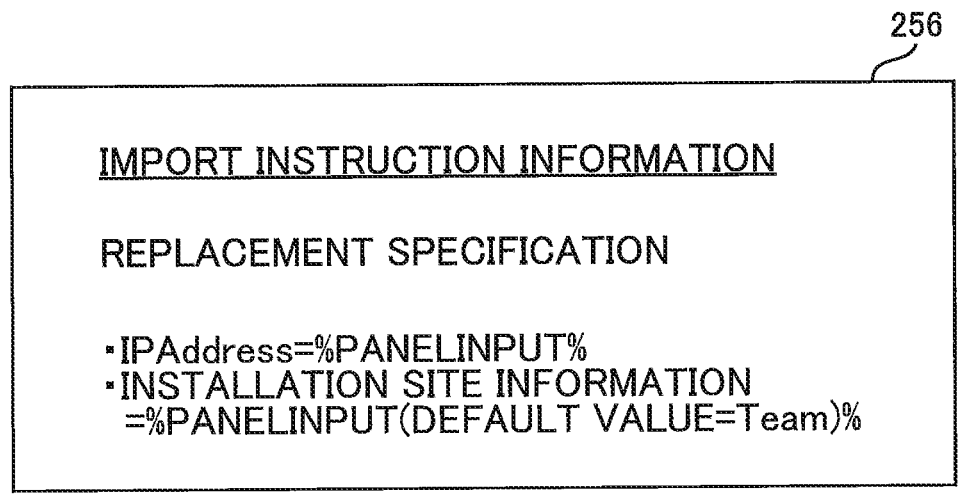
FIG. 12A illustrates an example of the import instruction information in a case where the user is required to input replacement content.
Figure 12B:
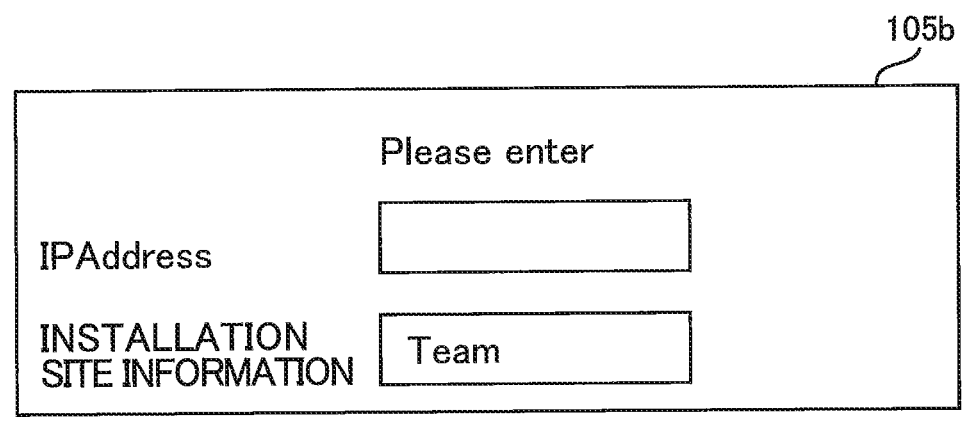
FIG. 12B illustrates an example of a screen displayed in a case where importation is executed based on the import instruction information shown in FIG. 12A.

FIGS. 12A and 12B show a format in which the user is required to input replacement content for a replacement specification. While the import instruction information 254 in the example of FIG. 6 includes replacement content, in FIG. 12 the user inputs the replacement content via the display panel 105.

FIG. 12A shows import instruction information 256 when the user is required to input replacement content. The description in the import instruction information 256 indicates that the user is to input the entire IP address and that the user is to add (or subtract) input to an initial value ("Team" in this example) to specify the installation site information. Hence, if the user wishes to specify "Team1" as the installation site information, the user simply inputs a "1" on the panel 105.

FIG. 12B shows an example of a screen 105b displayed on the display panel 105 when the CPU 101 executes an import based on the import instruction information 256.

Effects of the Embodiment

When a USB memory 200 storing the import setting information 210 and the import instruction information 250 on importation of the import setting information 210 is connected to the USB interface 107 in the present embodiment, the MFP 100 imports one or more setting items from the import setting information 210 into the nonvolatile memory 104 of the MFP 100 in accordance with the import instruction information 250. Accordingly, setting configurations can be simplified by not requiring the user to select, exclude, or replace content to be imported.

While the disclosure has been described in detail with reference to the above embodiments, it would be apparent to those skilled in the art that various changes and modifications may be made thereto.

(1) In the embodiment, the MFP 100 is provided as an example of the information-processing device. However, the information-processing device may be an single printer, scanner, or copying machine.

(2) In the embodiment, the MFP 100 does not have a facsimile function. However, the MFP 100 may have the facsimile function. Further, the setting information may included information about an address book.

(3) In the embodiment, the CPU 101 is provided as an example of a controller. However, the controller may include both of a CPU and a dedicated circuit. The dedicated circuit is an Application Specific Integrated Circuit (ASIC) or a Field Programmable Gate Array (FPGA), for example.

(4) In the embodiment, the USB interface 107 is provided as an example of the input-output interface, but the input-output interface may also be a wireless interface, such as a near-field communication (NFC) interface or a Bluetooth (registered trademark) interface. Secure Digital Input Output (SDIO) may also be used as the input-output interface. In these cases, the removable storage medium is provided with an interface that is compatible with the employed input-output interface.

(5) In the embodiment described above, the setting information import process of FIG. 8 is started when the USB memory 200 is connected to the MFP 100b via the USB interface 107. However, the setting information import process may be initiated when the USB memory 200 is connected to the USB memory 200 while the user of the MFP 100 is performing a prescribed operation, such as pressing a Stop key included in the keys 106, for example. In addition, the setting information import process may be automatically initiated at this time. Alternatively, the user may be first notified through a prescribed form of notification that the setting information import process will begin, after which the process may be initiated automatically or may be initiated once a command to start is received from the user.

(6) In the embodiment described above, the unique information is the serial number. However, the unique information is not limited to the serial number. The unique information may be information (such as a MAC address) whose value is a unique value assigned to each individual MFP. In other words, the unique information may be information for individually identifying an MFP.

What is claimed is:

1. An information-processing device comprising:
a storage storing setting information including an operation setting for the information-processing device;
a controller configured to operate according to the setting information stored in the storage; and
an input-output interface to which a removable storage medium is connectable, the removable storage medium storing import setting information and import instruction information on importation of the import setting information, the import setting information being setting information for importation, the import setting information including a plurality of setting items,
wherein the controller is further configured to perform:
(a) importing, while the removable storage medium is connected to the input-output interface, one or more designated setting items of the plurality of setting items into the storage in accordance with the import instruction information,
wherein the information-processing device is assigned unique information whose value is a unique value for the information-processing device, and
wherein the controller is configured to further perform:
(b) determining, when the import instruction information includes unique information, whether the unique information included in the import instruction information matches the unique information assigned to the information-processing device, and
wherein the (a) importing is performed in response to determination being made in (b) that the unique information included in the import instruction information matches the unique information assigned to the information-processing device.

2. An information-processing device comprising:
a storage storing setting information including an operation setting for the information-processing device;
a controller configured to operate according to the setting information stored in the storage; and an input-output interface to which a removable storage medium is connectable, the removable storage medium storing import setting information and import instruction information on importation of the import setting information, the import setting information being setting information for importation, the import setting information including a plurality of setting items, wherein the controller is further configured to perform:
(a) importing, while the removable storage medium is connected to the input-output interface, one or more designated setting items of the plurality of setting items into the storage in accordance with the import instruction information, wherein the information-processing device is assigned model information whose value is the same for information-processing devices with the same specifications, and wherein the controller is configured to further perform:
(c) determining, when the import instruction information includes model information, whether the model information included in the import instruction information matches the model information assigned to the information-processing device, and wherein the (a) importing is performed in response to determination being made in (c) that the model information included in the import instruction information matches the model information assigned to the information-processing device.

3. An information-processing device comprising:
a storage storing setting information including an operation setting for the information-processing device;
a controller configured to operate according to the setting information stored in the storage; and
an input-output interface to which a removable storage medium is connectable, the removable storage medium storing import setting information and import instruction information on importation of the import setting information, the import setting information being setting information for importation, the import setting information including a plurality of setting items, wherein the controller is further configured to perform:
(a) importing, while the removable storage medium is connected to the input-output interface, one or more designated setting items of the plurality of setting items into the storage in accordance with the import instruction information, wherein the controller is configured to further perform:
(d) determining, when the import instruction information includes operation information specifying a specific operation to the information-processing device, whether the specific operation matches an operation received by the information-processing device, and wherein the (a) importing is performed in response to determination being made in (d) that the specific operation matches the received operation.

4. An information-processing device comprising:
a storage storing setting information including an operation setting for the information-processing device;
a controller configured to operate according to the setting information stored in the storage; and
an input-output interface to which a removable storage medium is connectable, the removable storage medium storing import setting information and import instruction information on importation of the import setting information, the import setting information being setting information for importation, the import setting information including a plurality of setting items, wherein the controller is further configured to perform:
(a) importing, while the removable storage medium is connected to the input-output interface, one or more designated setting items of the plurality of setting items into the storage in accordance with the import instruction information wherein the import instruction information includes a selection instruction to select one or more specific setting items from the plurality of setting items, and wherein the one or more designated setting items are the one or more specific setting items selected in accordance with the selection instruction.

5. The information-processing device according to claim 4, wherein the input-output interface is a USB interface, and wherein the removal storage medium is a USB memory.

6. The information-processing device according to claim 4, further comprising a print engine configured to print an image on a sheet,
wherein the plurality of setting items included in the import setting information includes a setting item for the print engine.

7. An information-processing device comprising:
a storage storing setting information including an operation setting for the information-processing device;
a controller configured to operate according to the setting information stored in the storage; and
an input-output interface to which a removable storage medium is connectable, the removable storage medium storing import setting information and import instruction information on importation of the import setting information, the import setting information being setting information for importation, the import setting information including a plurality of setting items, wherein the controller is further configured to perform:
(a) importing, while the removable storage medium is connected to the input-output interface, one or more designated setting items of the plurality of setting items into the storage in accordance with the import instruction information, wherein the import instruction information includes an exclusion instruction to exclude one or more specific setting items of the plurality of setting items, and wherein the one or more designated setting items are all of one or more setting items that remain after the one or more specific setting items are excluded in accordance with the exclusion instruction.

8. An information-processing device comprising:
a storage storing setting information including an operation setting for the information-processing device;
a controller configured to operate according to the setting information stored in the storage; and
an input-output interface to which a removable storage medium is connectable, the removable storage medium storing import setting information and import instruction information on importation of the import setting information, the import setting information being setting information for importation, the import setting information including a plurality of setting items, wherein the controller is further configured to perform:
(a) importing, while the removable storage medium is connected to the input-output interface, one or more designated setting items of the plurality of setting items into the storage in accordance with the import instruction information, wherein the import instruction information includes a replacement instruction to replace a value of each of one or more specific setting items with a corresponding one of one or more designated values, and wherein the one or more designated setting items are the one or more specific setting items whose values are replaced in accordance with the exclusion instruction.

\* \* \* \* \*